United States Patent
Jun et al.

(10) Patent No.: US 6,873,391 B2
(45) Date of Patent: Mar. 29, 2005

(54) LCD PANEL AND METHOD FOR FABRICATING THE SAME

(75) Inventors: Jae Hong Jun, Seoul (KR); Woong Kwon Kim, Kunpo-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 221 days.

(21) Appl. No.: 09/893,974

(22) Filed: Jun. 29, 2001

(65) Prior Publication Data

US 2002/0047980 A1 Apr. 25, 2002

(30) Foreign Application Priority Data

Oct. 23, 2000 (KR) .......................................... 2000-62325

(51) Int. Cl.$^7$ ..................... G02F 1/1335; G02F 1/1333; G02F 1/1339
(52) U.S. Cl. ........................ 349/158; 349/153; 349/190; 349/106; 349/110
(58) Field of Search ................................. 349/106, 110, 349/153, 158, 190

(56) References Cited

U.S. PATENT DOCUMENTS

| 5,953,094 A | * | 9/1999 | Matsuoka et al. ........... 349/153 |
| 6,104,466 A | * | 8/2000 | Buchwalter et al. ........ 349/187 |
| 6,407,783 B1 | * | 6/2002 | Ohgawara et al. .......... 349/110 |
| 6,486,930 B1 | * | 11/2002 | Kwon .......................... 349/48 |
| 6,552,764 B2 | * | 4/2003 | Fujioka et al. ............... 349/106 |

FOREIGN PATENT DOCUMENTS

JP           403287232 A   * 12/1991

* cited by examiner

*Primary Examiner*—Huyen Ngo
(74) *Attorney, Agent, or Firm*—McKenna Long & Aldridge LLP

(57) ABSTRACT

A liquid crystal display and its fabrication method. The liquid crystal display includes a first substrate with a groove around a TFT array, a second substrate having a ridge that fits into the groove, a liquid crystal layer over display area, and a seal between the first substrate and the second substrate. The seal bonds the first and second substrates together, and the ridge maintains the liquid crystal over the TFT array. When fabricating the display, the liquid crystal is located within the ridge, the seal is beneficially outside the ridge, and the ridge fits into the groove.

32 Claims, 2 Drawing Sheets

LCD PANEL AND METHOD FOR FABRICATING THE SAME

This application claims the benefit of Korean Patent Application No. 2000-62325 filed on Oct. 23, 2000, which is hereby incorporated by reference as if fully set forth herein.

BACKGROUND OF THE INVENTION

1. Field of the Invention

The present invention relates to liquid crystal displays. More particularly, it relates to liquid crystal display panels in which a liquid crystal is located on a thin film transistor array substrate before the panel substrates are bonded together.

2. Background of the Related Art

In general, a liquid crystal display (LCD) panel includes a first transparent substrate, a second transparent substrate, and a liquid crystal injected between the first and second transparent substrates. The first transparent substrate includes a plurality of gate lines that extend in one direction, a plurality of perpendicular data lines, and a matrix of thin film transistors and pixel electrodes in pixel regions that are defined by the gate lines and the data lines. The second transparent substrate includes a black matrix, for shielding light incident between the pixel regions, and color filters.

The first and second transparent substrates are typically bonded together by a sealing material such that a gap is formed between the two substrates. In the prior art, the liquid crystal is usually injected into the gap. To enable injection, the sealing material is printed with an injection hole through which the liquid crystal is injected. The injection hole is then sealed. If the sealing material does not include an injection hole, the liquid crystal is deposited on one substrate within a volume defined by the sealing material, and then the first and second substrates are bonded together.

FIG. 1 is a plan view of a related art first substrate with a sealing material, FIG. 2 illustrates a section of a related art LCD panel comprised of the sealing material and a liquid crystal on the first substrate, and an adjacent second substrate before the bonding of the two substrates together, and FIG. 3 illustrates a section of a related art LCD panel having a liquid crystal interposed between two bonded substrates.

Referring now to FIG. 1, when fabricating a related art LCD panel a seal 2 comprised of a sealing material is printed around an active array region of a first glass substrate 1. The active array region includes a plurality of gate lines (not shown), a plurality of data lines (not shown), and a matrix of thin film transistors and pixel electrodes (also not shown). As the sealing material does not include an injection hole, an appropriate amount of liquid crystal 3 is dropped onto the first glass substrate 1 and inside the seal 2 by a dispenser. Referring now to FIG. 2, a second glass substrate 4 having a black matrix (not shown) and color filters (not shown) is then located over the first glass substrate 1. Then, as shown in FIG. 3, the first and second glass substrates 1 and 4 are bonded together so as to seal the liquid crystal 3 between the first and second glass substrates 1 and 4.

While conceptually easy to do, the related art method of fabricating LCD panels has problems. First, locating the correct amount of liquid crystal inside the seal 2 is difficult. Second, an excessive amount of liquid crystal inside the seal 2 can lead to damage to the seal 2 during bonding, resulting in a defective panel or a panel with poor adhesion between substrates. In particular, when the liquid crystal 3 contacts the top of the seal 2 the bond between first and second glass substrates 1 and 4 can be weakened.

Therefore, a new method of fabricating LCD panels without an injection opening would be beneficial.

SUMMARY OF THE INVENTION

Accordingly, the principles of the present invention are directed to LCD panels and to their fabrication methods that substantially obviate one or more of the limitations and disadvantages of the related art.

An object of the present invention is to provide an LCD panel and its fabrication method that can increase manufacturing yield.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof, as well as in the appended drawings.

To achieve these and other advantages and in accordance with the purpose of the present invention, as embodied and broadly described, a liquid crystal display panel includes a first substrate having a groove around a defined area, a second substrate having a ridge opposite the groove and that fits into the groove, a seal between the first and second substrates and exterior to the defined area, and a liquid crystal between the first and second substrates and over the defined area.

Preferably, the first and second glass substrates have patterned materials that are formed with the groove and ridge, respectively.

The patterned materials are beneficially formed of an organic compound or by a photoresist.

Preferably, one of the substrates has gate lines, data lines, thin film transistors, and pixel electrodes.

Preferably, one of the substrates has a black matrix and color filters.

In another aspect of the present invention there is provided a method of fabricating an LCD panel, including the steps of (a) forming a groove around a TFT array on a first substrate, (b) forming a ridge that fits into the groove on a second substrate, (c) locating a seal comprised of a sealing material on one of the substrates and outside of the TFT array, (d) dropping a liquid crystal inside the ridge, and (e) bonding the first and second substrates together using the seal such that the ridge is in the groove.

In another aspect of the present invention there is provided a method of fabricating an LCD panel, including the steps of (a) forming a ridge around a TFT array on a first substrate, (b) forming a groove on a second substrate such that the ridge fits into the groove, (c) locating a seal comprised of a sealing material on one of the substrates and outside of the TFT array, (d) locating liquid crystal inside the ridge, and (e) bonding the first and second substrates together using the seal such that the ridge in the groove.

It is to be understood that both the foregoing general description and the following detailed description are exemplary and explanatory only and are intended to assist understanding of the principles of the present invention.

BRIEF DESCRIPTION OF THE DRAWINGS

The accompanying drawings, which are included to provide a further understanding of the principles of the present In the drawings.

DETAILED DESCRIPTION OF THE ILLUSTRATED EMBODIMENT

Figure 1:
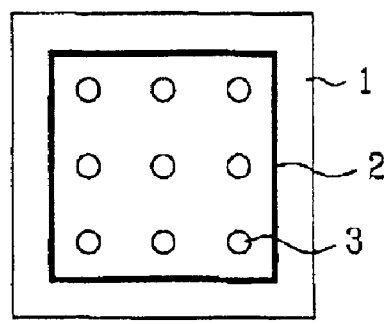
FIG. 1 is a plan view of a related art glass substrate having a seal and a liquid crystal.
Figure 2:
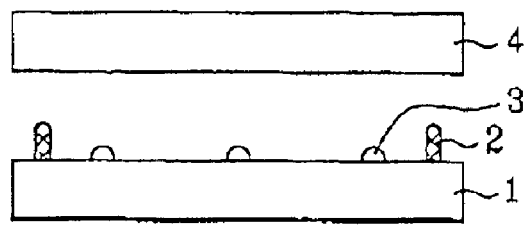
FIG. 2 illustrates a section of a related art LCD panel having two glass substrates, one with a seal, and a liquid crystal.
Figure 3:
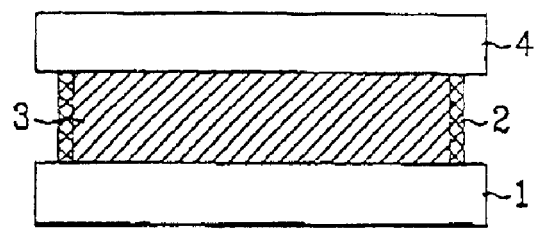
FIG. 3 illustrates a section of a related art LCD panel having a liquid crystal interposed between two substrates that are bonded together.
Figure 4:
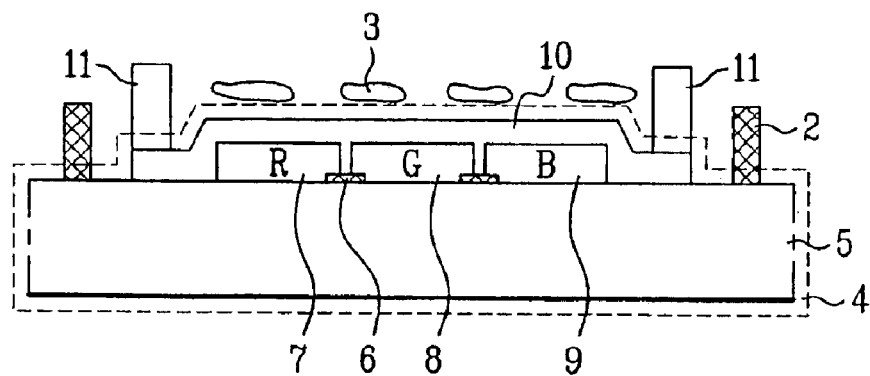
FIG. 4 illustrates a section of a second glass substrate that is in accord with the principles of the present invention.

Reference will now be made in detail to a illustrated embodiment of the present invention, the example of which is shown in the accompanying drawings. FIG. 4 illustrates a section of a second glass substrate according to the principles of the present invention, FIG. 5 illustrates a section of a first glass substrate according to the principles of the present invention, and FIG. 6 illustrates a section of an LCD panel according to the principles of the present invention.

Figure 5:
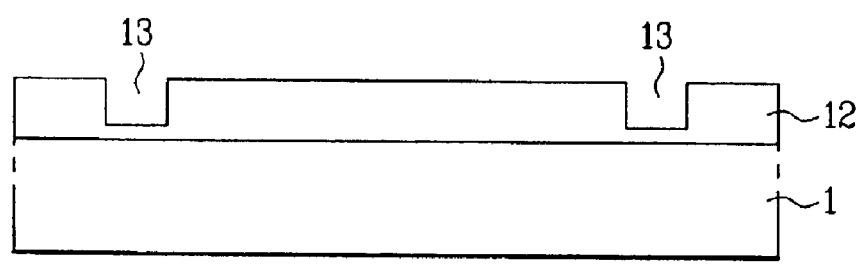
FIG. 5 illustrates a section of a first glass substrate that is in accord with the principles of the present invention.
Figure 6:
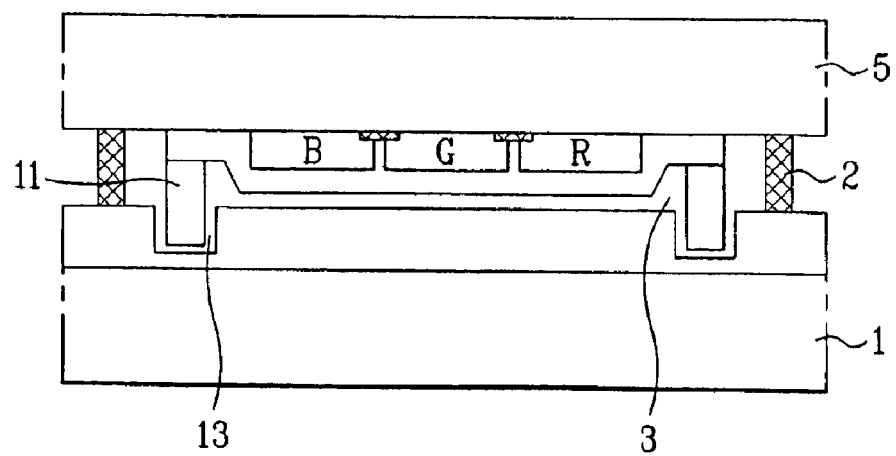
FIG. 6 illustrates a section of an LCD panel that is in accord with the principles of the present invention.

Referring now to FIG. 5, a first glass substrate 1 includes a plurality of gate lines that extend in one direction, and a plurality of perpendicular data lines (the gate lines and data lines are not shown in the drawings). Those lines define a pixel matrix. A thin film transistor (TFT) is located adjacent each pixel. Each TFT responds to switching signals on the gate line to transfer signals on a data line to a pixel electrode. As shown, the first glass substrate 1 includes a first patterned material 12. The first patterned material 12 is patterned with a groove 13. That groove extends around an active region area containing the gate lines, data lines, TFTs, and pixel electrodes. The first patterned material 12 is beneficially formed of a photoresist or of an organic compound. In any event, the location and dimensions of the groove 13 are well defined.

Referring now to FIG. 4, a second glass substrate 5 includes a black matrix 6 that blocks light from one pixel from leaking into other pixels. The second glass substrate 5 also includes red filters 7, green filters 8, and blue filters 9 in each pixel region. Those color filters are disposed between openings in the black matrix 6. Additionally, an overcoat layer 10 is disposed over the second substrate 5, including over the red, green, and blue filters 7, 8, and 9. Though not shown, there is also a common electrode on the overcoat layer 10.

The second glass substrate 5 further includes a ridge 11. That ridge is beneficially comprised of a photoresist or of an organic compound. A liquid crystal 3 on the second glass substrate 5 and within the ridge. Additionally, a seal 2 formed of a sealing material is placed around the ridge 11. Significantly, the ridge 11 and the groove 13 are fabricated such that the ridge fits into the groove.

Then, as shown in FIG. 6, the first and second glass substrates are bonded together such that the liquid crystal 3 is between the first and second glass substrates. The seal 2 bonds the substrates together with the liquid crystal within the ridge.

A method of fabricating an LCD panel of the present invention will be explained. Referring now back to FIG. 4, a first material pattern 12 is formed from a photoresist or from an organic compound. Photolithography techniques are beneficially used. Though not shown, an orientation film is also beneficially formed on the first material pattern 12 over the active region. That orientation film is rubbed in a fixed direction to assist liquid crystal alignment.

Then, as shown in FIG. 5, a black matrix layer 6 is formed on the second glass substrate 5. The black matrix layer is beneficially photolithographically formed with openings opposite the pixel regions of the first glass substrate 4. Then, red, green, blue filters 7, 8, 9 are formed within the black matrix openings. The overcoat layer 10 is then located over the exposed surfaces. Though not shown, a common electrode is formed of a transparent conductor (such as indium-tin-oxide) on the overcoat layer 10. The ridge 11 is formed to fit into the groove 13. The ridge 11 is beneficially formed photolithographically of photoresist or of an organic compound.

Then, a seal 2 comprised of a sealing material is coated on the second glass substrate 5. Referring now to FIG. 6, the second substrate 5 is turned over and a liquid crystal 3 is dropped onto the second glass substrate 5 and within the ridge 11. The first glass substrate 1 and the second glass substrate 5 are then bonded together by the seal 2 after fitting the ridge 11 inside the groove 13. While bonding, the first glass substrate 1 and the second glass substrate 5 are slowly pressed together such that the dropped liquid crystal 3 is spread evenly across the area defined by the ridge 11.

While reference has been made to using a first glass substrate with a groove 13, a first substrate can have a ridge 11 instead of a groove 13. Then, the second glass substrate would have the groove 13. Additionally, both substrates can have rubbed alignment films. Furthermore, spacers can be sprayed over a substrate such that a constant gap between the first and second substrates exists. Also, the seal 2 can be formed on either substrate.

While the foregoing has described the ridge and groove as being formed on patterned materials, it is also possible to directly form the ridge and/or the groove directly on a substrate. For an example, a substrate can be etched or mechanical worked to form a groove and/or a ridge.

An LCD panel and a fabricating method that are in accord with the principles of the present invention have significant advantages. The groove and ridge can prevent the liquid crystal from overflowing the sealing material. Relatively large variations in the amount of liquid crystal can be accommodated. Injection holes can be eliminated. Furthermore, the possibility of weak bonding caused by the liquid crystal coming into contact with the sealant is reduced. Fabrication efficiency and yield can be improved. It will be apparent to those skilled in the art that various modifications and variations can be made to the above described LCD panel and fabrication method without departing from the spirit or scope of the invention. Thus, it is intended that the present invention covers all modifications and variations that come within the scope of the appended claims and their equivalents.

What is claimed is:

1. A liquid crystal display panel, comprising:
   a first substrate having a groove around a display area;
   a second substrate having a ridge that extends into the groove; and
   a liquid crystal layer interposed between the first and second substrates, wherein the liquid crystal is over the display area.

2. A liquid crystal display panel according to claim 1, further including a seal between the first and second substrates.

3. A liquid crystal display panel according to claim 1, wherein the first and second substrates are transparent.

4. A liquid crystal display panel according to claim 3, wherein the first and second substrates are glass.

5. A liquid crystal display panel according to claim 1, wherein the groove is formed in a patterned material.

6. A liquid crystal display panel according to claim 5, wherein the patterned material is formed of an organic compound or of a photoresist.

7. A liquid crystal display panel according to claim 1, wherein the ridge is formed in a patterned material.

8. A liquid crystal display panel according to claim 7, wherein the patterned material is the same material as that of a photoresist.

9. A liquid crystal display panel according to claim 1, wherein the second substrate includes a black matrix and color filters.

10. A liquid crystal display panel according to claim 1, wherein the display area includes a thin film transistor array.

11. A liquid crystal display panel according to claim 1, wherein the groove receives the entire cross-sectional area of the ridge.

12. An LCD panel, comprising:
   a first substrate having a display area;
   a first patterned material on said first substrate, said first pattern material having a groove around said display area;
   a second substrate adjacent said first substrate;
   a second patterned material on said second substrate, said second patterned material having a ridge that extends into said groove;
   a seal between said first substrate and said second substrate; and,
   a liquid crystal interposed between said first substrate and said second substrate and on said display area.

13. An LCD panel as claimed in claim 12, wherein said first patterned material and said second patterned material are formed from an organic compound.

14. An LCD panel as claimed in claim 12, wherein said first patterned material and said second patterned material are formed from photoresist.

15. A liquid crystal display panel according to claim 12, wherein the groove receives the entire cross-sectional area of the ridge.

16. A method of fabricating a liquid crystal display panel, comprising:
   (a) forming a first substrate with a groove around a display region;
   (b) forming a second substrate with a ridge that can fit into the groove;
   (c) coating a sealing material such that the sealing material is disposed around the display area;
   (d) locating a liquid crystal over the display region; and
   (e) bonding the first substrate to the second substrate with the sealing material such that the ridge fits into the groove and such that the liquid crystal is between the first substrate and the second substrate.

17. A method as claimed in claim 16, wherein the groove is formed in a patterned material.

18. A method as claimed in claim 17, wherein the patterned material includes an organic compound.

19. A method as claimed in claim 17, wherein the patterned material includes a photoresist.

20. A method as claimed in claim 16, wherein the ridge is formed in a patterned material.

21. A method as claimed in claim 20, wherein the patterned material includes an organic compound.

22. A method as claimed in claim 20, wherein the patterned material includes a photoresist.

23. A method as claimed in claim 16, wherein the second substrate includes a black matrix.

24. A method as claimed in claim 16, wherein the second substrate includes a color filter.

25. A method as claimed in claim 16, wherein bonding the first substrate to the second substrate is performed by pressing the first substrate and the second substrate together.

26. A liquid crystal display panel according to claim 16, wherein the groove receives the entire cross-sectional area of the ridge.

27. A method for fabricating an LCD panel, comprising the steps of:
   (a) forming a first substrate with an array area;
   (b) forming a first patterned material on the first substrate, wherein the first patterned material includes a groove around the array area;
   (c) forming color filters on a second substrate;
   (d) forming a second patterned material on the second substrate, wherein the second patterned material includes a ridge dimensioned to align with the groove;
   (e) locating a liquid crystal inside the ridge; and
   (f) bonding the first and second substrates together using a sealing material disposed around the array area.

28. A method as claimed in claim 27, wherein the first patterned material includes an organic compound.

29. A method as claimed in claim 27, wherein the first patterned material includes a photoresist.

30. A method as claimed in claim 27, wherein the second patterned material includes an organic compound.

31. A method as claimed in claim 27, wherein the second patterned material includes a photoresist.

32. A liquid crystal display panel according to claim 27, wherein the groove receives the entire cross-sectional area of the ridge.

* * * * *